United States Patent [19]

Caracofe et al.

[11] Patent Number: 5,458,317
[45] Date of Patent: Oct. 17, 1995

[54] CABLE TOOL

[76] Inventors: Ellis L. Caracofe, 2016 Lyndhurst Ave., Charlotte, N.C. 28209; Bailey Harris, 2118 Archdale Dr., Charlotte, N.C. 28210; Marjorie A. Kay, 1015 18th St., NW., Suite 403, Washington, D.C. 20036

[21] Appl. No.: 187,465

[22] Filed: Jan. 28, 1994

[51] Int. Cl.⁶ .................................................. B63B 35/03
[52] U.S. Cl. .................................................. 254/134.3 R
[58] Field of Search .................................. 140/117, 118, 140/123, 147, 149; 24/130, 129 C, 115 K; 294/99.1, 99.2, 57; 81/177.6; 116/110 R; 254/134.3 FT, 134.3 R; 269/3, 6, 217, 254 R

[56] References Cited

U.S. PATENT DOCUMENTS 1,019,057  3/1912  Lawson ................................ 24/129 C
2,727,720  12/1955  Barth ............................. 254/134.3 FT
3,585,885  6/1971  Carr ..................................... 81/177.6

Primary Examiner—Robert C. Watson

[57] ABSTRACT

A cable tool is disclosed for receiving and retaining a cable or wire during its installation, adjustment, or removal in highly confined or otherwise inaccessible spaces. The cable tool includes a circular head portion transitioning to a handle portion formed from the two ends of the tubing which define the head portion. The plane of the head portion is offset from the plane of the handle portion at a perpendicular angle. The handle portion is adapted to be used with a segmented extension handle.

10 Claims, 1 Drawing Sheet

FIG. 1 (PRIOR ART)
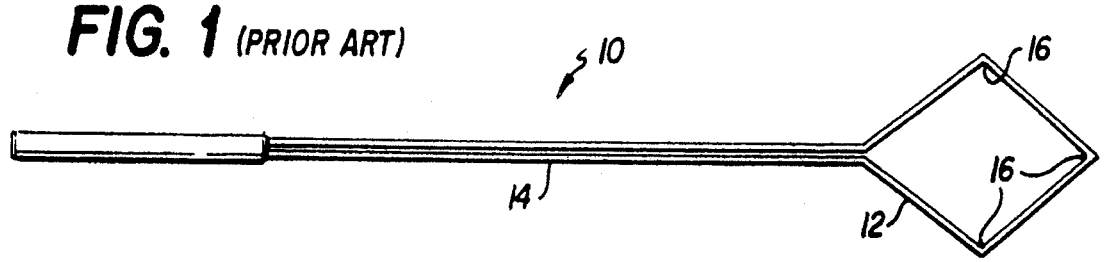
FIG. 2 (PRIOR ART)
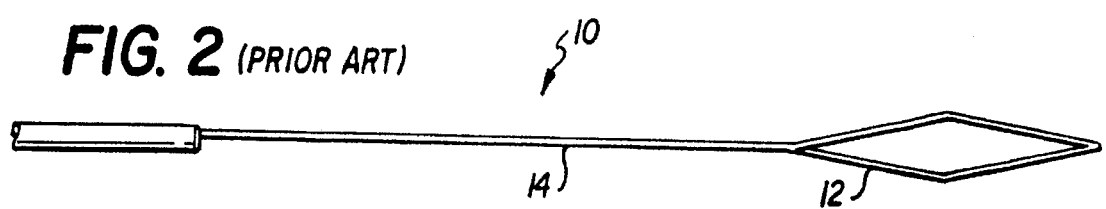
FIG. 3
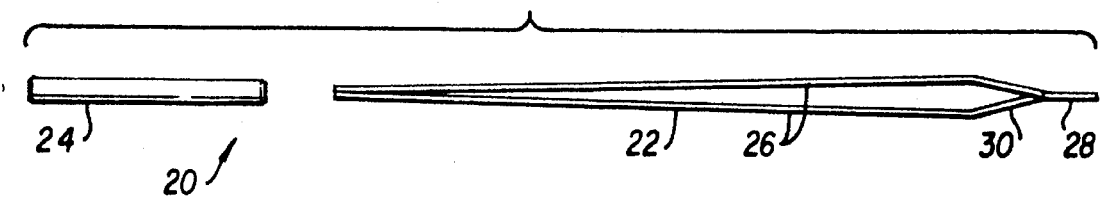
FIG. 4
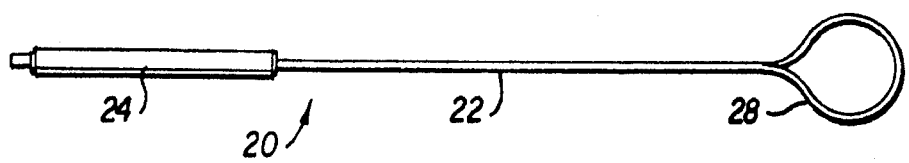
FIG. 5
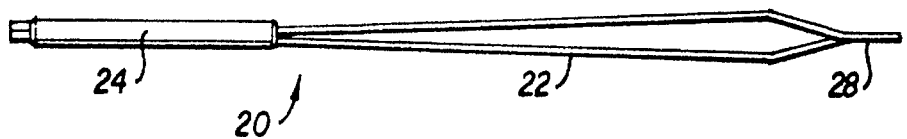
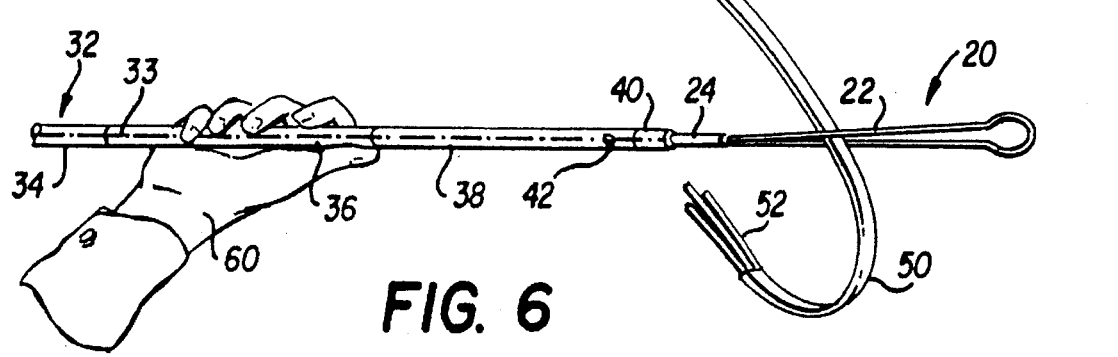
FIG. 6

CABLE TOOL

FIELD OF THE INVENTION

The present invention relates to cable installation tools, and more particularly to a cable installation tool for receiving and retaining a cable or wire during its installation, adjustment, or removal in remote or inaccessible spaces.

DESCRIPTION OF THE PRIOR ART

Accurate placement of cables, wires, and other flexible and semi-flexible conductors and conduits is necessary during their installation, maintenance, repair, and removal in highly confined or remote spaces in which they are routed and constrained. Such accurate placement has become even more critical in view of the increasing number and complexity of electrical and fluidic systems resident in the wall, ceiling and floor cavities of most building and conduit structures. For example, most buildings contain cable and wire systems for transmitting electrical power, telephone communications, and air handling system control and feedback signals. Yet additional cable and wire systems which carry computer signal transmissions and cable television signals, and the like are being retrofitted to an increasing number of buildings. As each new system is added, direct access to a selected cable or wire or bundle thereof is becomes increasingly encumbered by the presence of the previously installed cables or wires or a myriad of other structures. Accordingly, what is needed to gain access to a selected cable or wire is a cable tool which is capable of reliably receiving and retaining the cable or wire during its installation, adjustment, or removal at a predetermined location, or in the instance where routing of a new cable or wire is required, i.e., this tool must be capable of reliably retaining one end of the selected cable as it is being threaded through remote or otherwise inaccessible areas.

One tool previously used for cable and wire installation is shown in FIGS. 1 and 2. This tool, formed from spring wire, includes a diamond shaped head portion extending to a handle portion. The head portion is formed with three acutely angled corners, and is substantially planar with the handle portion. An important problem occurs when a cable or wire which is received within the head portion and is then passed to the handle portion where is retained. It has been determined that the flexure caused by the retained cable imposes large stresses on the head portion, resulting in premature failure of the tool. It is believed that the cause of these stress-related failures is the sharply-angled geometry of the head portion, whereby concentrated stress loading occurs at the angled corners which precipitates stress- and fatigue-related failures over time.

SUMMARY OF THE INVENTION

It is therefore an object of the present invention to provide an apparatus for reliably receiving and retaining a cable or wire during use.

It is another object of the present invention to provide an apparatus for receiving and retaining a cable or wire, the apparatus being is adapted for use with an extension handle.

The present invention is a cable tool for reliably receiving and retaining a cable or wire during its installation, adjustment, or removal in highly confined or otherwise inaccessible areas. The cable tool includes a head portion formed from brass tubing, the tubing transitioning to a handle portion formed from the two ends of the tubing which define the head portion. The head portion is substantially circular, and transitions to a substantially linear handle portion. The plane of the head portion is offset from the plane of the handle portion, preferably at a perpendicular offset, by twisting the head portion to the required position. The handle portion is adapted to be used with an extension handle, such as a segmented extension rod having a unitary elastic cord running through each segment to retain the rod in an extended position or allowing the rod to be folded into a compact storage arrangement.

With the foregoing and other objects, advantages and features of the invention that will become hereinafter apparent, the nature of the invention may be more clearly understood by reference to the following detailed description of the invention, the appended claims, and to the several views illustrated in the drawings.

BRIEF DESCRIPTION OF THE DRAWINGS

FIG. 1 is a plan view of a prior art cable tool showing a diamond shaped head portion;

FIG. 2 is a perspective view of the prior art cable tool of FIG. 1, showing the cable tool rotated to an acute angle;

FIG. 3 is an exploded, elevational view of the cable tool of the present invention;

FIG. 4 is a plan view of the cable tool shown in FIG. 3, showing a circular head portion offset from the handle portion by 90 degrees;

FIG. 5 is an assembled, elevational view of the cable tool shown in FIG. 3; and

FIG. 6 is a perspective view of the cable tool of the present invention, showing the tool assembled to a segmented extension rod, and a bundle of cables or wires retained by the cable tool during manipulation thereof.

DETAILED DESCRIPTION OF THE INVENTION

Referring now in detail to the drawings wherein like parts are designated by like reference numerals throughout, there is illustrated in FIGS. 1 and 2 a prior art cable tool 10 formed from spring wire, which includes a diamond shaped head portion 12 extending to a handle portion 14. The diamond shape of the head portion 12 is formed with three acutely angled corners 16, and is substantially planar with the handle portion 14.

Referring now to FIGS. 3–5, the cable tool 20 of the present invention includes a handle portion 22 formed from paired, opposing lengths 26 of brass tubing transitioning into a substantially circular head portion 28 at a twist portion 30 of the tubing. As will be further described, the handle portion 22 is subsequently employed as a mounting portion to be received and retained by an extension rod. According to one embodiment of the present invention, the mounting portion length 24 is formed from a unitary length of brass tubing having an outer diameter in the range of about 0.125 inch, and an overall length of about 1.0 inch, with a wall thickness in the range of about 0.010–0.020 inch. According to another embodiment, the head portion is formed from tempered spring wire or music wire having a thickness in the range of 0.04–0.05 inch formed into a circular configuration having an overall diameter in the range of about 0.25–1.00 inch, and preferably 0.375 inch. The head portion of this second embodiment necks down to a handle portion for a length of about 3.0 inches to create a cable receiving and retaining structure having an overall length of about 3.5 inches.

According to either embodiment, a length of the handle portion 22 is then encapsulated with an electrically-insulative rubber or polymeric sleeve 24, which prevents separation of the paired lengths 26 of the handle portion 22. According to the invention, and with particular reference to FIG. 4, the plane of the head portion 28 is offset from the plane of the handle portion 22, preferably at a perpendicular angle thereto, by twisting the head portion 28 to the required angular offset. Alternatively, the head portion 28 may be retained in a coplanar orientation relative to the handle portion 22. As will be appreciated by the skilled artisan, this angle is readily modified to overcome the challenges and requirements of a particular cable or wire installation, including reorientation of the head portion 28 to a non-rectilinear orientation relative to the handle portion 22.

Now referring to FIG. 6, the cable tool 20 is adapted to be mated with a segmented extension rod 32 having a unitary elastic cord 33 projecting through a plurality of interconnected segments 34, 36, 38 to retain the rod in an extended position or allowing the rod to be folded into a compact storage arrangement. A collar 40 located at a distal end of the rod 32 is adapted to receive the sleeved handle portion 22 along the length of segment 38 sufficient to be securely engaged thereto with a rivet, screw, or other like fastener 42 extending transversely through the segment 38. One suitable extension rod is manufactured by Morely U.S.A. Ltd, Charlotte, N.C., and distributed under the trade names Extend-a-Stick and Vertech CableMate.

In use, a bundle 50 containing a plurality of cables or wires 52 is received at the circular head portion 28. The bundle 50, or alternatively an individual cable or wire 52, is then passed into the handle portion 22 where it is retained by the compressive force of the paired lengths 26 until it is dislodged therefrom by the user 60.

Although certain presently preferred embodiments of the cable tool of the present invention have been described herein, it will be apparent to those skilled in the art to which the invention pertains that variations and modifications of the described embodiments may be made without departing from the spirit and scope of the invention. Accordingly, it is intended that the invention be limited only to the extent required by the appended claims and the applicable rules of law.

We claim:

1. A cable installation tool for receiving and retaining a cable, comprising:

a one-piece curvilinear head portion having two leg members extending to an elongated handle portion;

means for clamping said leg members into opposing registry;

whereby the cable is received within the head portion and slidingly passed into said handle portion, and wherein said leg members define a first plane and said head portion defines a second plane, said head portion being offset from said first plane at a twist region at the conjunction of said head portion and said handle portion.

2. The cable installation tool as claimed in claim 1, wherein said head portion is perpendicular to said first plane.

3. The cable installation tool as claimed in claim 1, wherein said cable is retained within said handle portion with an interference fit between said leg members.

4. The cable installation tool as claimed in claim 1, wherein said head portion and said handle portion is comprised of brass tubing, and said clamping means is an elastomeric sleeve.

5. The cable installation tool as claimed in claim 1, wherein the head portion has an overall diameter in the range of about 0.5–1.5 inches.

6. The cable installation tool as claimed in claim 1, wherein the head portion has an overall diameter of about 1.0 inch.

7. The cable installation tool as claimed in claim 1, wherein said tool is comprised of tempered spring wire, said head portion having an overall diameter in the range of about 0.25–1.0 inch, and said handle portion having an overall length of about 3.0 inches.

8. The cable installation tool as claimed in claim 1, wherein said sleeved handle portion is mated with a segmented extension rod.

9. An extensible cable installation tool, comprising:

a one-piece curvilinear head portion having two leg members extending to an elongated handle portion; and a segmented extension rod adapted to securely retain said handle portion, whereby said cable is received within the head portion and slidingly passes into said handle portion with an interference fit; and wherein said leg members define a first plane and said head portion defines a second plane, said head portion being offset from said first plane at a twist region at the conjunction of said head portion and said handle portion.

10. The cable installation tool as claimed in claim 9, wherein said head portion is perpendicular to said first plane.

* * * * *